United States Patent
Hudson

(10) Patent No.: US 8,615,741 B2
(45) Date of Patent: Dec. 24, 2013

(54) SOFTWARE DEFECT TRACKING

(75) Inventor: Thomas R. Hudson, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 12/647,271

(22) Filed: Dec. 24, 2009

(65) Prior Publication Data
US 2011/0161933 A1    Jun. 30, 2011

(51) Int. Cl.
*G06F 9/44*    (2006.01)
(52) U.S. Cl.
USPC ........... 717/125; 717/123; 717/124; 717/126; 717/127; 717/128; 717/129
(58) Field of Classification Search
USPC ........................................................ 717/125
See application file for complete search history.

(56) References Cited

U.S. PATENT DOCUMENTS

| | | | |
|---|---|---|---|
| 8,151,248 B1 * | 4/2012 | Butler et al. | 717/124 |
| 2003/0137536 A1 | 7/2003 | Hugh | |
| 2005/0096966 A1 * | 5/2005 | Adi et al. | 705/10 |
| 2005/0216797 A1 * | 9/2005 | Dietz et al. | 714/699 |
| 2006/0230384 A1 * | 10/2006 | Potts et al. | 717/124 |
| 2007/0168757 A1 * | 7/2007 | Kobrosly et al. | 714/46 |
| 2007/0234293 A1 * | 10/2007 | Noller et al. | 717/124 |
| 2008/0046484 A1 | 2/2008 | Ellis et al. | |
| 2008/0091774 A1 | 4/2008 | Taylor et al. | |
| 2008/0126325 A1 | 5/2008 | Pugh et al. | |
| 2008/0154750 A1 | 6/2008 | Hegemier et al. | |
| 2008/0208602 A1 | 8/2008 | Westernoff | |
| 2008/0244325 A1 * | 10/2008 | Tyulenev | 714/38 |

OTHER PUBLICATIONS

Jeffrey N. Johnson and Paul F. Dubois, Issue Tracking, Scientific Programming, CSA Technology Research Database, Nov./Dec. 2003.

* cited by examiner

*Primary Examiner* — Chun-Kuan Lee
*Assistant Examiner* — Brooke Taylor
(74) *Attorney, Agent, or Firm* — Kunzler Law Group

(57) ABSTRACT

An apparatus, system, and method are disclosed for improved tracking of software item defects. The approach involves maintaining defect attributes for a particular software bug. Certain attributes are user-defined while others are derived. Attributes may be, for example, questions, requests for action, requests for approval, or others. The primary attributes and derived attributes for the bug are associated with users that are associated with the software bug, and a determination is made as to whether or not action is required by the individual users for the software bug using the attributes. If action is required, the user is alerted that action is required for the software bug. The actions and/or bugs may be presented to the user using an inbox format. The inbox may sort actions based on priority, what type of attribute is relevant to the user, or using other categorizations.

20 Claims, 6 Drawing Sheets

SOFTWARE DEFECT TRACKING

FIELD OF THE INVENTION

This invention relates to tracking changes in software systems, and more particularly relates to an improved approach to managing and presenting software defect items to software developers.

BACKGROUND

Description of the Related Art

Software development and maintenance often involves teams working together to develop, maintain, and repair software. A large portion of software maintenance goes towards resolving software defects commonly referred to as "bugs." In order to manage software defects, programs such as IBM's Team Concert and Bugzilla allow developers to track software defects. For example, a developer may be assigned or decide to manage a particular software defect. A developer may be interested in the progress or work being done on a particular software defect. Changes to the software defect, actions affecting it, comments, and other events are then reported to the developer. In many situations, the events are reported through an email or an RSS feed, or both. The tracking software may also be used for general project management. For example, the tracking software may be used to monitor improvements to a program, changes made to a program, or program development.

However, a developer is often involved in a large number of software defects. As a result, the developer may receive numerous emails or notifications of activity for the particular software defect. As a result, the developer must try to manage the notifications about software defects and filter the important defects from the unimportant ones. Given the amount of noise in the developer's inbox created by the many notifications, it can be difficult to quickly and easily determine which actions should be taken and what actions are most important.

For example, there is little or no distinction between important information (such as a request for the developer's action on a particular software defect) and unimportant information (such as a notification that developer B is now being copied for the software defect). There is no collapsing of changes to a single software defect; thus, three changes or actions concerning the software defect trigger three different notifications. In addition, notifications are often duplicated; thus, a developer may be notified of a change in the software defect in both his email and the RSS feed. The state of the notification (read, unread, etc) is not shared between the notification systems. The developers assigned to the software defect typically are given a role (such as the owner) that cannot be changed. In addition, there is often only one mechanism to subscribe to a defect. This arrangement often results in important software defects being neglected, miscommunication amongst the development team, and a generally inefficient software defect management system.

BRIEF SUMMARY

The present invention has been developed to provide an apparatus, system, and method for improved change management software, such as software defect management. The method involves maintaining a plurality of defect attributes for a software defect item. The defect attributes include at least one primary attribute and at least one derived attribute. The primary attributes are provided by users of the system, and the derived attributes are derived from the primary attributes. Primary attributes are set directly by one or more users for the particular software defect item. The primary attributes may also be built in. Derived attributes may also be derived using other derived attributes, as discussed below.

The method may involve associating at least one of the primary attributes and at least one of the derived attributes with users that are associated with the software defect item. The method may also involve determining if action is required by the user on the software defect item. In addition, the list of users involved with the particular action may be updated. The users involved with the particular software defect item may be dynamically changing based on both user input and based on derivations from user input. This determination is made using the primary attributes and the derived attributes. If action is required by the user, the user is alerted as to what action is required from him or her. Thus, the user's specific relationship to the particular software defect is one example of a derived attribute. The derived attributes may be stored in a database to facilitate running queries or generating alerts based on the information in the database. Such queries may be too expensive to run without storing the derived attributes in a database.

As noted above, the method includes maintaining defect attributes for the software defect item. Maintaining the defect attributes may involve detecting changes in primary attributes and updating derived attributes to reflect the changes in the primary attribute. Maintaining the plurality of defect attributes can also include receiving primary attributes from one or more users. The process of maintaining the plurality of defect attributes may be done by automatically deriving derived attributes from the primary attributes through a background process.

As noted above, the software defect item is associated with defect attributes. Defect attributes may be primary attributes or derived attributes. Examples of primary attributes include general comments, directed comments, questions, action requests, priorities, blocked software defect items, and blocking software defect items. Derived attributes may include, for example, the item's state, its priority, whether the software defect item is blocking or blocked by another software defect item, and others. As shown in the above examples, certain items (such as priority) may be user-defined or derived.

Presenting software defect items to a user and alerting the user that action is required may be done by presenting an inbox to the user. Other approaches to presenting software defect items to the users may be used. The inbox may be divided into an active portion that contains software defect items for which action is required, and an inactive portion that contains software defect items for which no action is required. The inbox may also indicate which software defect items have changed since the user last viewed those software defect items. The inbox may also maintain for each user information on when the user last looked at the software defect item in the inbox, regardless of what device is used to view the inbox. The inbox be implemented by logging activity and basing the inbox around queries of the logs. In certain embodiments, activities involving primary attributes are logged and available in a history, whereas derived attributes do not show as entries in a history log and are derived from the information in those logs.

In certain embodiments, the software defect item may have a read/unread status flag to track whether there have been changes since a particular user last viewed the software defect item. In other embodiments, the changes occurring since the specific user last viewed the software defect item may be stored and later presented to the user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
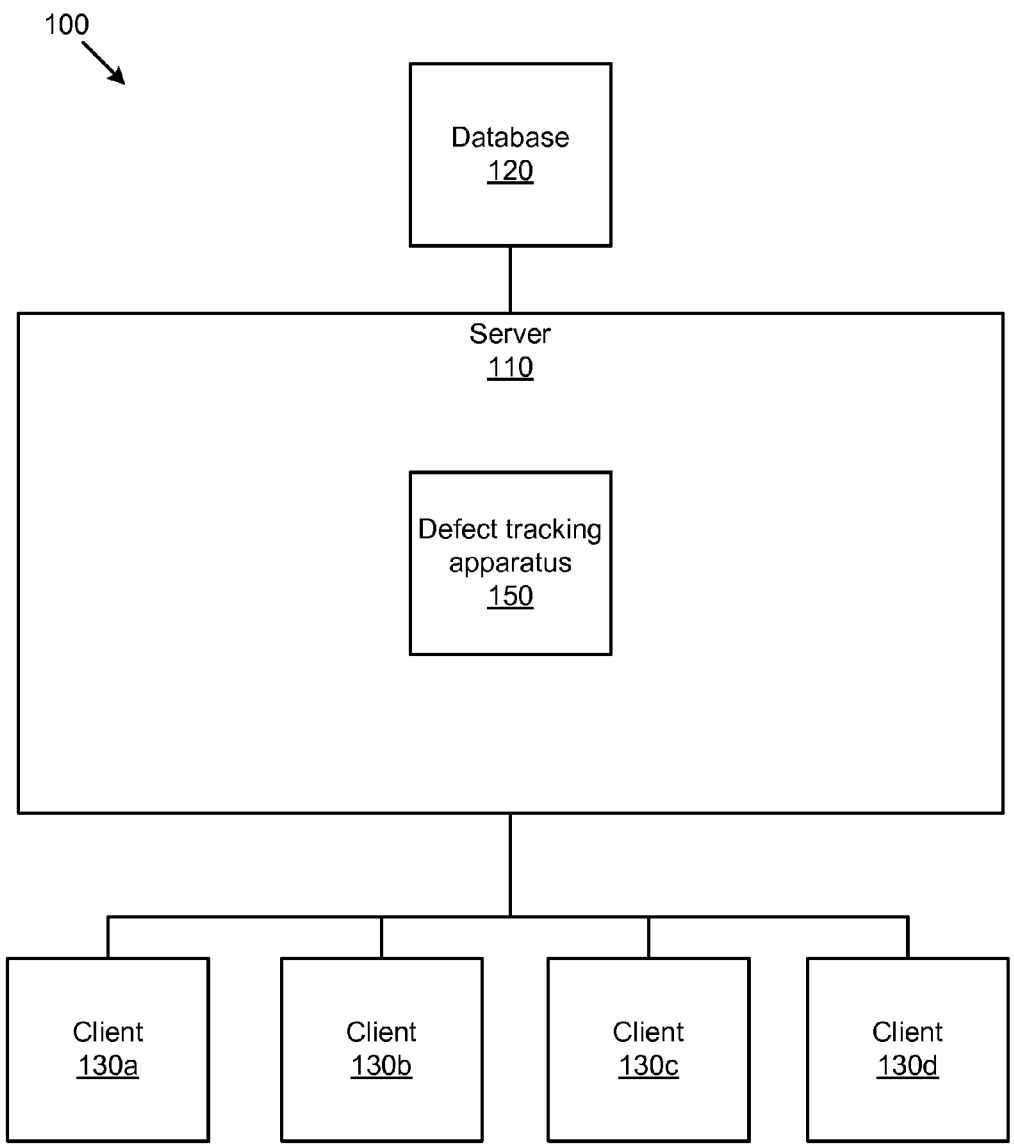
FIG. 1 is a block diagram of one embodiment of a system for defect tracking.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 illustrates one embodiment of a system 100 in which a defect tracking apparatus 150 that provides improved software defect tracking may operate. In one embodiment, the system 100 includes a database 120, a server 110, and clients 130a-d. In certain embodiments, the database 120, server 110, and all or some of the clients 130a-d may be implemented on the same hardware platform. In other embodiments, the components described above may be implemented separately, and connected by a communications connection such as a bus or a network.

The database 120 provides storage for the server 110 for the various operations that the server 110 performs. The database 120 may be a relational database, such as IBM's DB2, hierarchical, or other type of database. Applications and processes running on the server 110 may save information in the database 120.

The server 110 provides services to clients 130a-d. In one embodiment, the server 110 provides software defect management services. Many well-developed software programs still have trouble with software defects, or bugs. The server 110 may provide an application for managing and tracking the resolution of those bugs through the defect tracking apparatus 150. The defect tracking apparatus 150 may store information about the particular defect items in the database 120. The defect tracking apparatus 150 may also be used to track the development of improvements to a particular piece of software. The defect tracking apparatus 150 may also allow life cycles to be used to manage particular defect items.

Clients 130a-d access information on the server 110 and submit information to the server 110 through a communications connection. The clients 130a-d provide information about defect items to the defect tracking apparatus 150 and receive information about defect items from the defect tracking apparatus 150. Users typically interact with the server 110 through the clients 130a-d, and may use the clients 130a-d to submit new defect items, edit defect items, or perform other actions concerning defect items.

Figure 2:
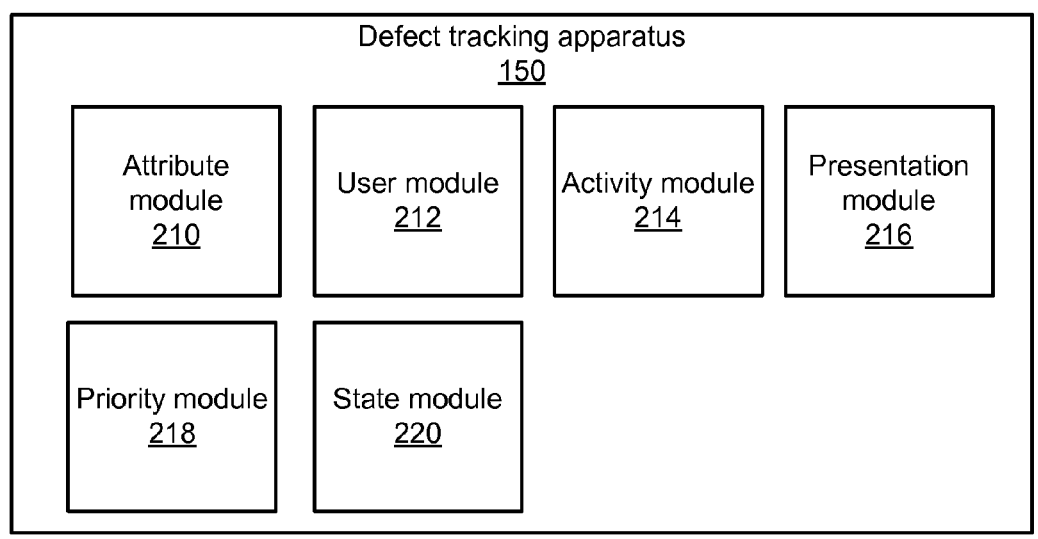
FIG. 2 is a schematic block diagram illustrating one embodiment of a defect tracking apparatus.

FIG. 2 shows one embodiment of a defect tracking apparatus 150. In one embodiment, the defect tracking apparatus 150 includes an attribute module 210, a user module 212, an activity module 214, a presentation module 216, a priority module 218, and a state module 220. The defect tracking apparatus 150 may include other modules or fewer modules than those shown. In certain embodiments, the defect tracking apparatus 150 is hardware, firmware, software for storage on a computer readable medium, or some combination thereof.

The attribute module 210 maintains one or more defect attributes for the software defect items in the system. A software defect item is a reported defect, bug, or modification for the software system for which the defect tracking apparatus 150 is tracking defects. The attributes are actions, comments, or descriptors that provide additional information about the software defect item. Attributes may be primary attributes or derived attributes. Other categories of attributes may also be implemented.

Primary attributes are those attributes that are set by a user of the defect tracking apparatus 150. For example, a primary attribute may be a general comment for the software defect item, a comment directed at one or more particular users, a question, or an action request. A primary attribute may also be a priority for the particular software defect item. Other primary attributes may also be used.

Derived attributes are those attributes that are derived from the primary attributes and are created without specific direction from a user. A derived attribute may be the software defect item's state, its priority, a list of blocking software defect items, and a list of blocked software defect items. User-defined and derived attributes are described in greater detail below. Certain attributes may be either set or derived; for example, the defect item's state may be defined by a user or derived according to a set of predefined rules. In certain embodiments, the defect item's state may be derived, but if a user chooses to set the defect item's state (or change it from the derived state) then the user-defined state takes precedence.

The user module 212 associates primary attributes and derived attributes with users that are associated with the particular software defect item. The associations are typically not identical for each user associated with the software defect item. For example, the defect item may have a primary attribute that is a question. The user who created the question for the defect item may have directed the question specifically to a particular user, or a particular group of the users associated with the defect item. The user module 212 may associate the question with only the user to whom the question was directed. In certain embodiments, the user module 212 associates the user to whom the question was directed with the question and also assigns a particular role to the user (for example, respondent). The user module 212 may then associate other users associated with the defect item (for example, those who have asked to be copied on activity for the defect item) and assign them a different role (for example, observer).

The activity module 214 determines if action is required by a particular user on the software defect item using the primary attributes and the derived attributes. In certain embodiments, the activity module 214 does so by scanning the primary attributes and the derived attributes looking for attributes that require action, determining the proper user to perform the actions, and then making the appropriate assignments. For example, the activity module 214 may determine that action is required by the user to whom the question is directed and decide that no action is required from the observers for the particular question.

The presentation module 216 presents the appropriate software defect items to the users in the system. The presentation module 216 also alerts the users that action is required if the activity module 214 determines that the user is required to take some action. In certain embodiments, the presentation module 216 presents a virtual inbox for each user with the relevant defect items listed in the inbox. The presentation module 216 may alert the user that action is required by placing the software defect item in a particular section of the inbox (such as a "to do" area), flagging the software defect item in the virtual inbox, or other approach of letting the user know that some action is required.

In certain embodiments, the inbox is divided into an "active" portion that contains software defect items for which action is required, and an "inactive" portion that contains software defect items for which no action is required. These active and inactive areas may themselves be further subdivided to facilitate easy interaction with the user. The inbox may also indicate which software defect items have changed since the user last viewed those software defect items; for example, software defect items that have new activity (such as new primary attributes or new derived attributes) may be presented in bold, while software defects for which no new activity has occurred may be presented in standard weight text.

In certain embodiments, the defect tracking apparatus 150 includes a priority module 218 that determines a priority for particular software defect items and for particular attributes. The priority may be a primary attribute, a derived attribute, or a combination of the two. In addition, particular attributes may have a different priority than the software defect item to which they are related. For example, a particular software item defect may be given a priority of "moderate" by a user, but the resolution of a particular question for the software item defect may be given a priority of "high."

In certain embodiments, the priority module 218 ensures that the priority for a particular software defect item or attribute is consistent with related software defect items or attributes. For example, in certain embodiments, the priority may be inherited from a parent; for example, the priority module 218 may require that the priority for a particular attribute of a software item defect (the parent) be at least the same as, or greater than, the priority of the software item defect.

In certain embodiments, the priority module 218 dynamically changes the priority of software item defects and attributes based on their relationship with peer software item defects and attributes. For example, a software item defect A may have a priority of moderate, while a software item defect B has a priority of high. In the event that software item defect A or an attribute of software item defect A is blocking progress on software item defect B, the priority module 218 may increase the priority of software item defect A to high. In certain embodiments, this change in priority is simply a change to the effective priority; the underlying priority defined by the user is not changed by the priority module 218. As a result, in such an embodiment, the underlying priority set by the user is used unless the priority module 218, in accordance with the rules set up for the priority module 218, determines that the effective priority of the software defect item should be increased, as in the example above.

In certain embodiments, the defect tracking apparatus 150 may include a state module 220 that maintains the read state of the defect tracking apparatus 150 and its attributes for each user that views activity for the software item defect. In one embodiment, the state module 220 places the state of the software item defect to "unread" in response to a change in the software defect item or its attributes that has occurred since the last time the user viewed the software defect item. The state module 220 may further ensure that the defect tracking apparatus 150 accurately maintains the state information across notification platforms; for example, if the user views the software item defect in one notification platform (such as email), the state is updated for all platforms. Thus, when the user uses another platform (such as the virtual inbox presented by the presentation module 216, an RSS feed, or other), the software item defect shows up as "read" since it was viewed in email.

The defect item's state may be user defined. One example of a state may be complete and in need of verification. Once a user has completed work on the defect item, she may be able to set the defect item's state to complete and in need of verification. At that point, a user who is assigned to verify the defect item (whether determined by the user who completed the work or the system) will see the defect item as requiring their attention. Thus, the state may facilitate work flow by ensuring a smooth transition from completion to verification.

Figure 3:
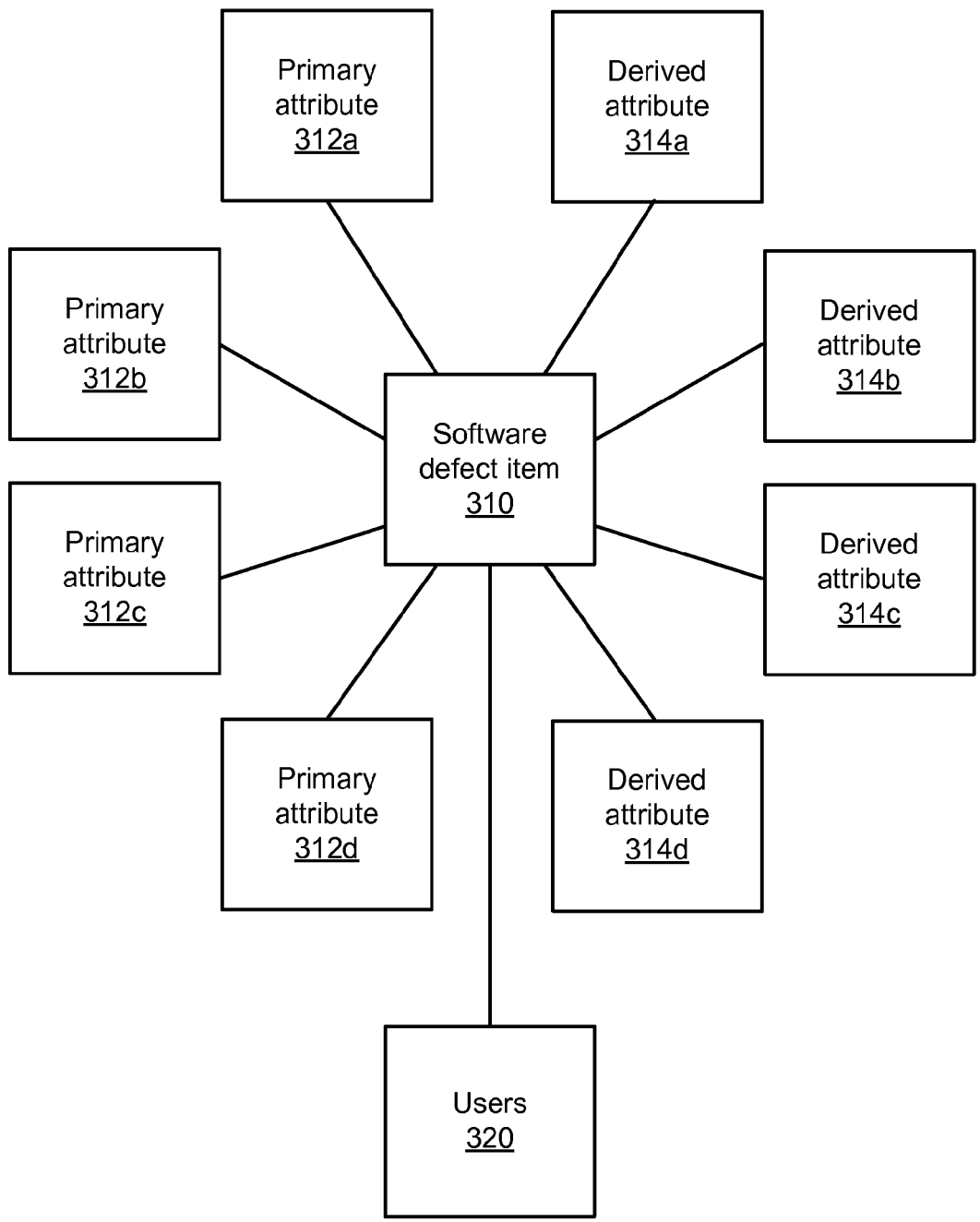
FIG. 3 is a schematic block diagram illustrating one embodiment of a model of a software defect item.

As noted above, the attribute module 210 maintains the attributes for software defect items in the system. In one embodiment, this involves the attribute module 210 receiving primary attributes from users in the system. The attribute module 210 thus allows the users to add, edit, or remove certain attributes for the software defect item. The attribute module 210 may receive these changes to primary attributes, determine that there is a change, and update the derived attributes to reflect the changes to the primary attributes. In certain embodiments, the attribute module 210 automatically derives the derived attributes from the primary attributes as a background process on the server 110. FIG. 3 shows one representation of software defect item 310. The software defect item 310, as noted above, may be a bug in a program that needs correction, an improvement, or other modification to the code of a software program. The software defect item 310 has primary attributes 312a-d, derived attributes 314a-d, and associated users 320. As noted above, changes to primary attributes (such as additions, deletions, and modifications) may be logged in a history log file. The derived attributes may not be logged in certain embodiments. In other embodiments, it may be useful to log changes to derived attributes as well. In certain embodiments, the derived attributes can be derived by performing operations on the history log containing the changes to primary attributes. The inbox discussed below may also be constructed such that the information about software defect items is presented to the user using queries against the history log. The primary attributes 312a-d are attributes that relate to the software defect item 310 that are provided by users 320. The derived attributes 314a-d are attributes that are derived using the primary attributes 312a-d. Certain derived attributes 314a-d may also be derived, at least in part, from other derived attributes 314a-d. There may be any number of primary attributes 312a-d and derived attributes 314a-d. The number of primary attributes 312a-d and derived attributes 314a-d need not be equal.

The users 320 are users that are associated with the software defect item 310. A user 320 associated with the software defect item 310 may be, for example, the "owner" of the software defect item 310, those users who are interested in the software defect item 310 and have asked to be copied on activity related to the software defect item 310, users to whom questions have been directed concerning the software defect item 310, and others.

Figure 4:
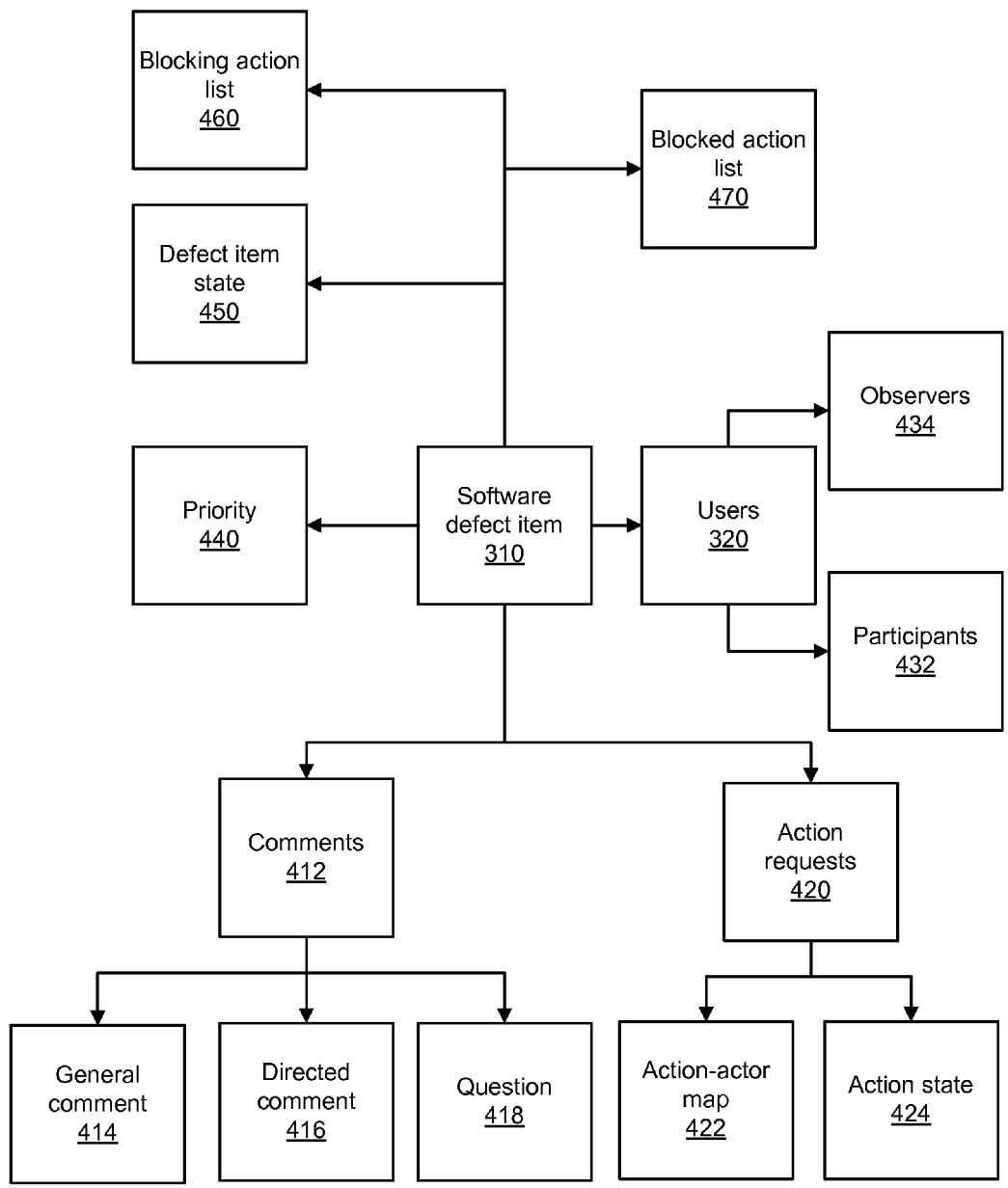
FIG. 4 is a detailed schematic block diagram illustrating another embodiment of a software defect item.

FIG. 4 shows one embodiment of a software defect item 310 with various examples of primary attributes and derived attributes. Software defect items 310 may have different attributes, or a subset of the attributes shown.

In one embodiment, rather than have a single collection of copied users, the software defect item 310 has an attribute such as users 320, which can be divided into observers 434 and participants 432. This attribute may be both user-defined and derived; for example, particular users 320 may explicitly add themselves as either participants 432 or observers 434; however, the attribute module 210 may alter the status of particular users based on other attributes. For example, if an observer 434 is assigned to perform a particular task, or asked a question, that observer 434 may be changed to a participant 432 until the question or task is resolved. The level of priority 440 shown to the users 320 for particular events related to the software defect item 310 may be affected by whether they are observers 434 or participants 432; for example, observers 434 may see all action as low priority.

In one embodiment, an action requests 420 attribute is part of the software defect item 310. The action requests 420 may be user-defined. The action requests 420 may maintain an associated structure that maps the action items to particular actors in the form of an action-actor map 422. For example, the attribute module 210 may maintain the action-actor map 422, which may be a table, an array, or other associative structure that associates particular action items with particular actors or groups of actors. For example, the owner of the software defect item 310 may assign a particular group to develop a piece of code related to the software defect item 310. The action item to actor association 422 may associate the group with the code development action item, may associate each member of the group with the action item, or both. In one embodiment, the action item is a request for approval that requires the approval of at least a portion of a group of users.

The attribute module 210 may also maintain an action state 424 that designates particular actions as complete, or incomplete. In one embodiment, once an action item is marked as complete in the action state 424, the action-actor pairings in the action-actor map 422 are removed. For example, if one user fulfills a request for an action, the action item is marked complete in the action state 424 and the action-actor map 422 entries for each actor that was assigned to the task is removed. In certain embodiments, the attribute module 210 may mark actors as participants 432 while the action is pending, and change the status of the actors to observers 434 once the action is resolved, as indicated by the action state 424.

Thus, rather than have a single owner, a software defect item 310 may have multiple actors. The attribute module 210 may maintain the state of the software defect item 310 for the various actors and manage the state while it changes.

In one embodiment, the software defect item 310 may have a comments 412 attribute. The comments 412 may, in one embodiment, have different types: such as the general comment 414, the directed comment 416, and a question 418. Different priorities may be assigned to different types of comments 412; for example, a general comment 414 may have the lowest priority, a directed comment 416 a higher priority for the person to whom the comment is directed, and a question 418 a higher priority still for the person who is being questioned.

The defect item priority 440 reflects the priority for the software defect item 310. The defect item priority 440 may be different for different users, as noted above; in certain embodiments, the attribute module 210 maintains a map or other associative structure that maintains the priority of the software defect item 310 for the various users 320. The defect item priority 440 may be derived from both primary attributes and derived attributes.

In certain embodiments, the attribute module 210 may also maintain a blocking action list 460 that indicates what actions for the software defect item 310 cannot be resolved until a blocking action is resolved. For example, a particular software defect item 310 (or an action for the software defect item 310) might require that another software defect item be corrected before the software defect item 310 can be fixed. The blocking action list 460 may also state which actions for the software defect item 310 block other actions for the software defect item 310. The blocking action list 460 may be implemented with a list structure or other data structure.

Similarly, the attribute module 212 may maintain a blocked action list 470 that indicates which actions for the software defect item 310 require resolution because they are blocking other actions or software defects. The blocking action list 460 and the blocked action list 470 may be defined by users, or derived, or some combination thereof.

The software defect item 310 may also maintain a defect item state 450 that reflects the current state of the software defect item 310; for example, the defect item state 450 may reflect whether the software defect item 310 is open, resolved, blocked, or blocking another software defect item.

The defect item state 450 may also differ from user to user. For example, a software defect item 310 may be open and awaiting approval. The approval request may be an action request 420. All users 320 except for the person who is to provide approval may see the software defect item 310 as open but blocked, while the user who needs to approve the software defect item 310 may see the software defect item 310 as open and actionable. In certain embodiments, a list is maintained indicating for whom the software defect item 310 is actionable and for whom the software defect item 310 is blocked. A similar approach may be taken for particular action requests 420, questions 418, or other action related to the software defect item 310 to provide a defect item state 450 that is particular to the user 320.

In one embodiment, the attribute module 212 also maintains a read status for each user 320 of the software defect item 310. In one embodiment, a timestamp is used to mark each time a user 320 views the software defect item 310. If an event occurs that changes an attribute of the software defect item 310 after the timestamp, the read status for the software defect item 310 for that user 320 is changed to unread.

In certain embodiments, users 320 could initiate an IM chat session with other users 320 about the software defect item 310 or a particular attribute of the software defect item 310 such as a comment 412, an action request 420, or other attribute. The chat session may be logged and associated with the software defect item 310.

Figure 5:
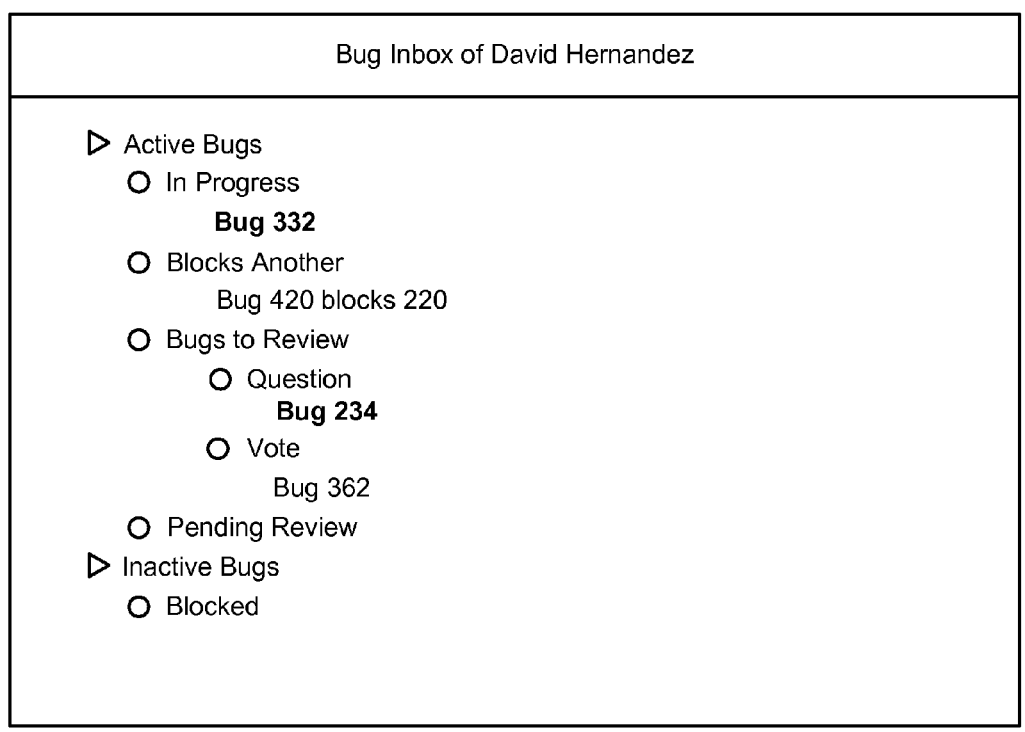
FIG. 5 is a schematic block diagram illustrating one embodiment of an interface for defect tracking.

FIG. 5 shows one embodiment of an inbox 500 that takes advantage of the enhanced attributes described above and presents information to a user. In one embodiment, the software for generating the inbox 500 runs on a server, and the users access the inbox 500 through a web browser. The inbox 500 may also have a client component and a server component working in conjunction to present information. In the depicted embodiment, the inbox 500 may refer to the software defect items as bugs.

In the depicted embodiment, the inbox 500 separates bugs into active bugs and inactive bugs. The determination of whether a particular bug is active or inactive may be made using the user-defined and derived attributes described above. Whether a particular bug is active or inactive for a particular user may also be a derived attribute for software defect items. In certain embodiments, bugs that are blocked (and thus cannot be worked on) are listed in inactive bugs. In addition, other actions may cause a particular software defect item to be shown as inactive. For example, when a user asks a question and notes that work cannot continue on the software defect item until the question is answered, the software defect item may be moved into the inactive bug category.

As shown, the "active bugs" category has sub-categories, such as "in progress", "blocks another", "bugs to review", "blocked", and "pending review." The bugs listed as in progress may include bugs for which action is required by the user associated with the inbox 500. Bugs that the user owns may also be presented as in progress if they do not fit in one of the other particular categories or sub-categories. Bugs may be listed in order of priority under each subcategory. In certain embodiments, a symbol (such as a color) is used to indicate the priority of each bug listed in the inbox 500.

The inbox 500 may also have a "blocks another" sub-category that identifies which bugs that the user is following are blocking another bug. In certain embodiments, only those bugs which the user is responsible for performing an action on are listed in the blocks another category. As shown, information about the nature of the block may be provided to the user; for example, FIG. 5 shows that the inbox 500 specifies that "Bug 420 blocks 220". The user may be responsible for performing some action on bug 420, and the inbox 500 thus alerts the user that he needs to resolve the bug 420 before the bug 220 can be resolved and/or moved forward. In certain embodiments, the bug 420 inherits the priority assigned to the bug 220 while the bug 420 is blocking the bug 220.

The inbox 500 may also present a category of bugs to review. This category may be further subdivided into bugs for which there is a question and bugs for which there is a pending vote. Other types of review actions may be represented by a separate category. In certain embodiments, the question and/or the vote may be targeted to the user specifically or targeted to a group to which the user belongs. In certain embodiments, once the user performs the requested review actions, the bugs in the section are removed from this section of the inbox 500.

In certain embodiments, the inbox 500 also tracks the read/unread state of particular bugs. FIG. 5 shows an embodiment where unread bugs are shown in bold. For example, FIG. 5 displays bugs 332 and 234 in bold, indicating that there is activity that has occurred since the user last viewed the bugs 332 and 234. As noted above, this read/unread state is ideally maintained across devices; thus, if the user has viewed the particular bug 332 in another forum (such as an email inbox, RSS feeder, or other) the bug 332 will recognize this as a read for every other forum.

The inbox 500 may further include a category for those bugs that the user is involved in (for example, either as an observer or a participant) that are blocked by another unresolved bug. A particular bug may require action by the user, but the user may not be able to perform the action until another bug is adequately resolved, thus removing the block. In certain embodiments, the attribute module 212 monitors the status of the blocking bugs and automatically updates the attribute status of the blocked bug once the blocking bug is resolved. The presentation module 216 may then update the presentation of the blocked bug in the inboxes of relevant users, thus moving the bug out of the blocked category and into another appropriate category such as "in progress."

In certain embodiments, the presentation module 216 also implements rules to specify priority among categories such that a bug that fits into multiple categories shows in only one place in the inbox 500. For example, the "blocked" category may have the highest priority, "blocks another" the second highest, a specific "bugs to review" category third, and the "in progress" classification last. Thus, if a particular bug blocks resolution of another and is itself blocked, the bug may appear in the blocked category. Once the blocking bug is resolved, the bug may then appear in the blocks another category, and so on.

The inbox 500 may also include a section for bugs that are pending review. This may include bugs which are tentatively resolved, but require sign off from additional users before the bug can be finally marked as resolved. Bugs awaiting votes from other individuals but not the user associated with the inbox 500 may also appear as pending review.

In certain embodiments, the inbox 500 may be organized to present events rather than specific bugs as shown in FIG. 5. The inbox 500 may present events such as a directed question, an action request, a vote request, a comment, or others discussed above and known to those in the art. The attribute module 212 may associate each event with one or more users. The presentation module 216 may use the association to present individualized inboxes to each user of the system. Certain events may be directed to particular users while others, such as general comments, a new user being added as an observer or participant, and a tag being added may be sent to all users. In certain embodiments, the events are given priorities and are presented according to the assigned priorities.

In certain embodiments, the inbox 500 also allows a user to view all events associated with a particular bug. The inbox 500 may allow the user to alternate between multiple views of events in the system. Thus, a user may choose an event-oriented view, and be able to switch to a bug-oriented view, and also be able to select a particular bug and see all events related to that bug. The flexibility in reviewing bugs and events greatly improves the ability of a user to quickly see meaningful activity and determine the best approach for resolving the various issues relevant to bugs in the system.

Figure 6:
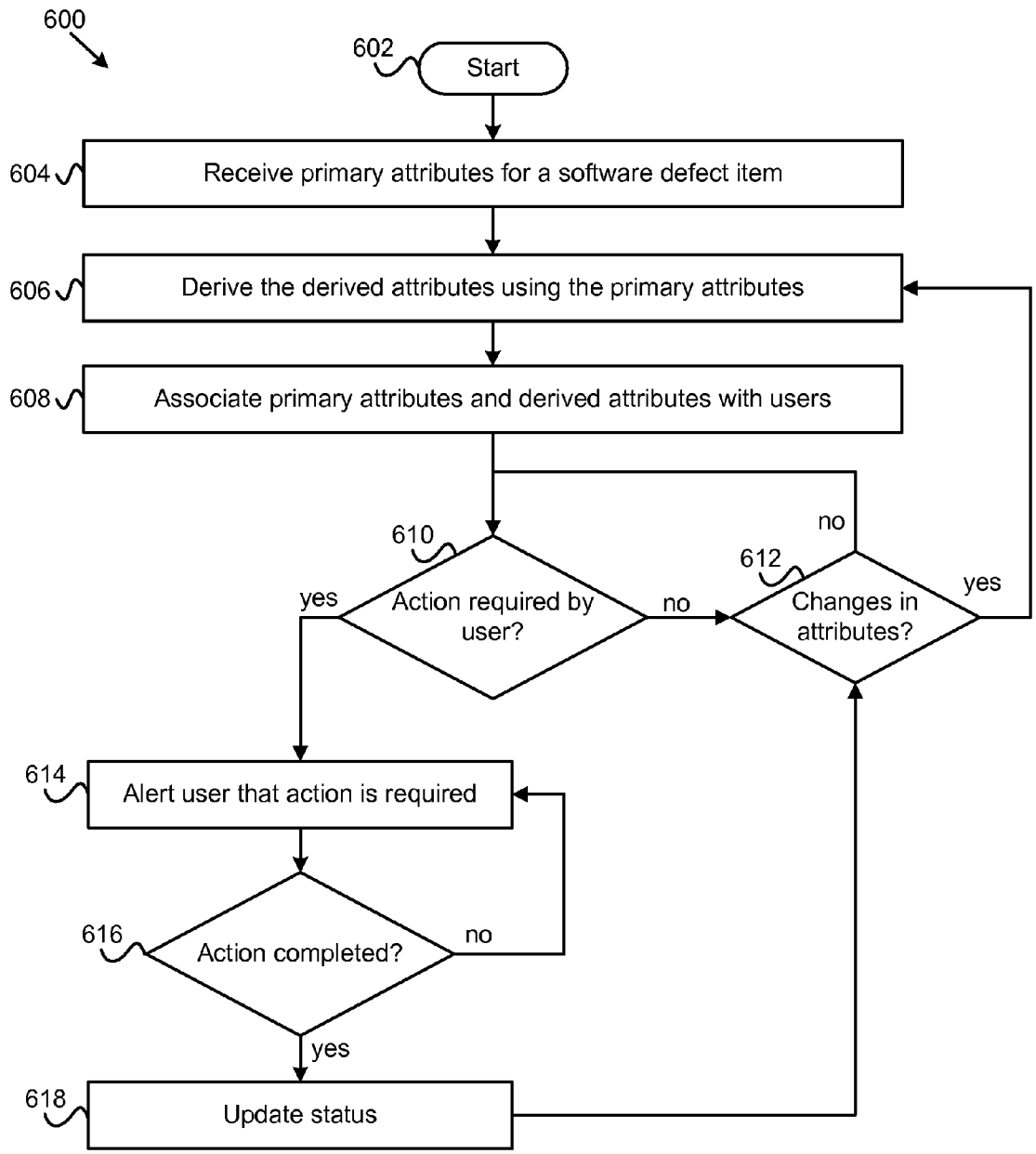
FIG. 6 is a schematic flow chart diagram illustrating one embodiment of a method for defect tracking.

FIG. 6 shows one embodiment of a method 600 for improved software defect tracking. In one embodiment, the method 600 begins with receiving 604 primary attributes for a software defect item. In one embodiment, the attribute module 214 receives the primary attributes. As noted above, primary attributes are those attributes that are set for the software defect item by users of the system.

The method 600 also includes deriving 606 derived attributes using the primary attributes. In certain embodiments, the attribute module 212 derives the derived attributes using the primary attributes. Derived attributes may be derived using both primary attributes and other derived attributes. Certain derived attributes may be derived from only the primary attributes.

The method 600 also includes associating primary attributes and derived attributes with users that are connected to the particular software defect item. The associations may be made by associating the users with particular software defect items, or by associating the user with particular actions for the software defect item. In one embodiment, the user module 212 makes the associations.

The method 600 also includes determining 610 if action is required by the user. The activity module 214 may make this determination. The determination may be made using the primary attributes and the derived attributes. The determination may also be made using the structures generated by the user module 212 that associate the users with actions. If no action is required, then the system is monitored 612 for changes in attributes. If there are changes, the attributes are adjusted accordingly and the determination of whether or not action is required is similarly adjusted.

If action is required by the user, the method includes alerting 614 the user that action is required. The presentation module 216 may alert the user through an email, RSS feed, a virtual inbox, or other. The method also includes determining 616 whether the action is completed. In one embodiment, the attribute module 210 makes this determination. If the action is completed, the status for the action is updated 618 (for example, the action is removed from the inbox).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improved management of software defect items, the method comprising:

maintaining, in a defect tracking apparatus, a plurality of defect attributes the plurality of defect attributes regarding a software defect item, wherein the software code is under a developing process by a software developer, the software defect item comprising a defect in software code, the plurality of defect attributes associated with the software defect item, wherein the plurality of defect attributes include at least one primary attribute and at least one first derived attribute, the at least one primary attribute received by the defect tracking apparatus from a user, a user comprising the software developer using the defect tracking apparatus to track software defect items, and wherein the first derived attribute is derived from one or more of a primary attribute and a second derived attribute of the plurality of defect attributes, the derived attributes derived using one or more predefined rules associated with the defect tracking apparatus without specific direction of a user;

associating at least one of the primary attributes and at least one of the derived attributes with a user, the user associated with the software defect item;

determining if action is required by the user on the software defect item, wherein the determination is made using the at least one primary attribute and the at least one derived attribute; and alerting the user that action by the user is required in response to determining that action is required by the user.

2. The method of claim 1, wherein maintaining the plurality of defect attributes comprises detecting a change in the primary attribute, and updating a related derived attribute to reflect the change in the primary attribute.

3. The method of claim 1, wherein defect attributes comprise one or more of actions, comments, and descriptors, the actions, comments, and descriptors providing information about the software defect item.

4. The method of claim 1, wherein maintaining the plurality of defect attributes comprises automatically deriving derived attributes through a background process.

5. The method of claim 1, wherein the primary attributes comprise at least one of a general comment, a directed comment, a question, and an action request.

6. The method of claim 1, wherein the derived attributes comprise at least one of a software defect item state, a priority, a blocked software defect item list, and a blocking software defect item list.

7. The method of claim 1, wherein alerting the user that action by the user is required comprises presenting an inbox to the user, and wherein the inbox is divided into an active portion containing software defect items for which action by the user is required, and an inactive portion containing software defect items for which no action by the user is required.

8. The method of claim 7, wherein the inbox indicates which software defect items have changed since the user last viewed those software defect items.

9. An apparatus for improved management of software defects, the apparatus comprising:
   an attribute module configured to maintain a plurality of defect attributes in a defect tracking apparatus for a software defect item, wherein the software code is under a developing process by a software developer, the software defect item comprising a defect in the software code, the plurality of defect attributes associated with the software defect item, wherein the defect attributes include at least one primary attribute, the at least one primary attribute received by the defect tracking apparatus from a user, a user comprising the software developer using the defect tracking apparatus to track software defect items, and at least one first derived attribute, and wherein the first derived attribute is derived from one or more of a primary attribute and a second derived attribute of the plurality of defect attributes, the first derived attribute derived using one or more predefined rules associated with the defect tracking apparatus without specific direction from a user;
   a user module configured to associate at least one of the primary attributes and at least one of the derived attributes with a user, the user associated with the software defect item;
   an activity module configured to determine if action is required by the user on the software defect item, wherein the determination is made using the at least one primary attribute and the at least one derived attribute; and
   a presentation module configured to alert the user that action by the user is required in response to determining that action is required by the user, wherein the attribute module, the user module, the activity module, and the activity module comprise one or more of logic hardware and executable code, the executable code stored on one or more non-transitory computer readable storage media.

10. The apparatus of claim 9, wherein the attribute module is configured to detect a change in the primary attribute, and update a related derived attribute to reflect the change in the primary attribute.

11. The apparatus of claim 9, wherein defect attributes comprise one or more of actions, comments, and descriptors, the actions, comments, and descriptors providing information about the software defect item.

12. The apparatus of claim 9, wherein the attribute module is configured to automatically derive derived attributes through a background process.

13. The apparatus of claim 9, wherein the primary attributes comprise at least one of a general comment, a directed comment, a question, and an action request.

14. The apparatus of claim 9, wherein the derived attributes comprise at least one of a software defect item state, a priority, a blocked software defect item list, and a blocking software defect item list.

15. The apparatus of claim 9, wherein the presentation module is configured to alert the user that action by the user is required by presenting an inbox to the user, wherein the inbox is divided into an active portion containing software defect items for which action by the user is required, and an inactive portion containing software defect items for which no action by the user is required.

16. The apparatus of claim 15, wherein the inbox indicates which software defect items have changed since the user last viewed those software defect items.

17. A computer program product comprising a non-transitory computer readable storage medium having computer usable program code executable by a processor to perform operations for improved management of software defect items, the operations of the computer program product comprising:
   maintaining, in a defect tracking apparatus, a plurality of defect attributes the plurality of defect attributes regarding a software defect item, wherein the software code is under a developing process by a software developer, the software defect item comprising a defect in software code, the plurality of defect attributes associated with the software defect item, wherein the plurality of defect attributes include at least one primary attribute and at least one first derived attribute, the at least one primary attribute received by the defect tracking apparatus from a user, a user comprising the software developer using the defect tracking apparatus to track software defect items, and wherein the first derived attribute is derived from one or more of a primary attribute and a second derived attribute of the plurality of defect attributes, the derived attributes derived using one or more predefined rules associated with the defect tracking apparatus without specific direction of a user;
   associating at least one of the primary attributes and at least one of the derived attributes with a user, the user associated with the software defect item;
   determining if action is required by the user on the software defect item, wherein the determination is made using the at least one primary attribute and the at least one derived attribute; and
   alerting the user that action by the user is required in response to determining that action is required by the user.

18. The computer program product of claim 17, wherein maintaining the plurality of defect attributes comprises detecting a change in the primary attribute, and updating a related derived attribute to reflect the change in the primary attribute.

19. The computer program product of claim 17, wherein defect attributes comprise one or more of actions, comments, and descriptors, the actions, comments, and descriptors providing information about the software defect item.

20. The computer program product of claim 17, wherein maintaining the plurality of defect attributes comprises automatically deriving derived attributes through a background process.

* * * * *